(12) United States Patent
Raghunathan

(10) Patent No.: US 9,678,326 B2
(45) Date of Patent: Jun. 13, 2017

(54) GENERATING PERSPECTIVE VIEWS IN MICROSCOPY

(71) Applicant: Agilent Technologies, Inc., Santa Clara, CA (US)

(72) Inventor: Varun Raghunathan, Santa Clara, CA (US)

(73) Assignee: Agilent Technologies Inc., Santa Clara, CA (US)

(*) Notice: Subject to any disclaimer, the term of this patent is extended or adjusted under 35 U.S.C. 154(b) by 240 days.

(21) Appl. No.: 14/501,903

(22) Filed: Sep. 30, 2014

(65) Prior Publication Data

US 2016/0091701 A1 Mar. 31, 2016

(51) Int. Cl.
*H04N 7/18* (2006.01)
*G02B 21/36* (2006.01)
*G02B 21/08* (2006.01)

(52) U.S. Cl.
CPC .......... *G02B 21/367* (2013.01); *G02B 21/086* (2013.01)

(58) Field of Classification Search
CPC G02B 21/365; G02B 21/367; G02B 21/6458; G02B 21/002
USPC ...................................... 348/79–81
See application file for complete search history.

(56) References Cited

U.S. PATENT DOCUMENTS

| 6,483,641 B1 | 11/2002 | MacAulay |
| 2014/0334745 A1* | 11/2014 | Fleischer ............... G06T 3/4061 382/284 |
| 2016/0003740 A1* | 1/2016 | Tao ......................... G01N 21/45 250/459.1 |

FOREIGN PATENT DOCUMENTS

EP 1 243 902 A1 9/2002

OTHER PUBLICATIONS

Li, M.J. et al.; Microshutter Array System for James Webb Space Telescope; Proc. of SPIE, vol. 6687; 668709 1-13 (2007).
Takahashi, Takuya et al.; Electrostatically Addressable Gatefold Micro-Shutter Arrays for Astronomical Infrared Spectrograph; Asia-Pacific Conference of Transducers and Micro-Nano Technology—APCOT (2006).

* cited by examiner

*Primary Examiner* — Andy Rao

(57) ABSTRACT

A microscope includes a spatial light modulator configured for adjusting the perspective angle of a view imaged at the light detector. The spatial light modulator is positioned at a pupil plane, or at an equivalent conjugate plane thereof, in the illumination light path or in the detection light path. The microscope enables perspective views of a sample at different angles, which may be utilized to generate a three-dimensional image of the sample.

20 Claims, 6 Drawing Sheets

GENERATING PERSPECTIVE VIEWS IN MICROSCOPY

TECHNICAL FIELD

The present invention relates generally to generating perspective views and a microscope configured to generate perspective views. Such perspective views may be utilized to produce three-dimensional images of a sample under investigation.

BACKGROUND

Microscopes are employed in a wide variety of fields to view various types of biological and non-biological samples. Most microscopes are limited to generating two-dimensional (2D) images of a sample. However, obtaining three-dimensional (3D) views of a sample would be desirable in order to provide better information as to feature shape, topography, and spatial distribution. Currently, 3D images may be acquired by scanning the axial depth of focus through the sample. The focal stack of images acquired in this manner may then be post-processed using 3D deconvolution algorithms and blending techniques to generate 3D views of the sample. However, the computation required makes these techniques slow and non-real time, and discrete axial sampling results in limited 3D information or artifacts in the 3D view. Recently light field microscopy has been implemented with a microlens array in front of the camera to resolve angular information for a collection of image pixels. However, the spatial resolution trade-off with this technique seems rather severe for viewing micrometer-sized samples in three-dimensional views in a single image capture.

Therefore, there is a need to provide microscopes and methods for generating 3D images of samples.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, a microscope includes: a light source; a condenser; a sample stage; an objective; a light detector configured for acquiring a plurality of perspective images at a plurality of different perspective angles, wherein the microscope defines an illumination light path from the light source, through the condenser and to the sample stage, and a detection light path from the sample stage, through the objective and to the light detector; and a spatial light modulator configured for adjusting the perspective angle of a view imaged at the light detector, wherein the spatial light modulator is positioned at a pupil plane or an equivalent conjugate plane thereof in the illumination light path or in the detection light path.

According to another embodiment, a method for acquiring perspective images of a sample includes: illuminating the sample by directing illumination light along an illumination light path from a light source, through a condenser, and to the sample; acquiring a plurality of perspective images of the sample by directing detection light along a detection light path from the sample, through an objective, and to a light detector; and while acquiring, adjusting a spatial light modulator such that the plurality of perspective images acquired comprises different perspective images acquired at different perspective angles of view of the sample, wherein the spatial light modulator is positioned at a pupil plane or an equivalent conjugate plane thereof in the illumination light path or in the detection light path.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Embodiments disclosed herein are capable of rendering three-dimensional (3D) views of a sample based on generating perspective views of the sample. Perspective views present images of the sample in a different and more intuitive format than scanning the axial depth of focus. For example, perspective view generation yields parallax cues, i.e., provides the ability to separate different depths based on the extent of rotation of the features of the sample about the rotation axis (through adjustment of the angle of the perspective view).

Figure 1:
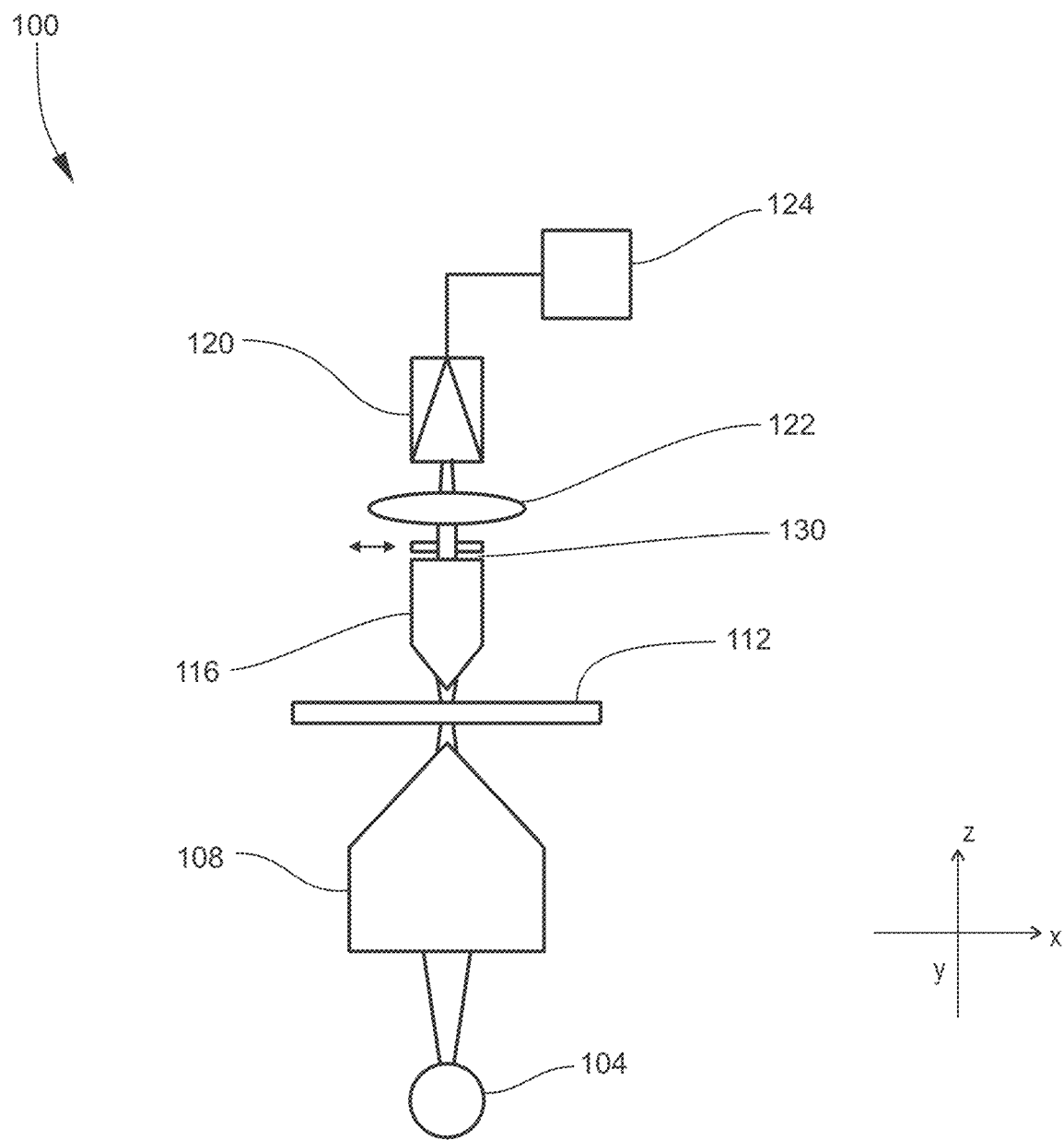
FIG. 1 is a schematic view of an example of a microscope according to some embodiments.

FIG. 1 is a schematic view of an example of a microscope 100 according to some embodiments. Generally, the structure and operation of various types of microscopes are understood by persons skilled in the art, and thus certain components and features of the microscope 100 are described briefly to facilitate an understanding of the subject matter taught herein. The microscope 100 may generally include a light source 104, a condenser 108 (condenser lens), a sample stage 112, an objective 116, and a light detector 120. The microscope 100 generally defines an optical axis or path from the light source 104, through the intermediate optics components, and to the light detector 120. The optical path may be considered as including an illumination light path that illuminates a sample under investigation that is supported on the sample stage 112, and a detection light path through which light emitted from the sample is transmitted to the light detector 120 for collection. Thus, the illumination light path runs from the light source 104, through the condenser 108, and to the sample, and the detection light path runs from the sample, through the objective 116, and to the light detector 120. Depending on the embodiment, light "emitted" from the sample may be light transmitted through the sample (as illustrated) or light reflected from the sample. In typical embodiments, the microscope 100 is configured for Köhler illumination.

The sample stage 112 may generally be a platform for securely holding a sample, or a sample and a substrate supporting the sample (e.g., a glass slide), in a fixed position thereon. In embodiments where illumination light is directed from below the sample stage 112 (as illustrated), the sample stage 112 may include a window or aperture to enable passage of the illumination light. In some embodiments, the sample stage 112 may be movable by manual or motorized actuation. That is, the position of the sample stage 112 may be adjustable by the user along the x-axis, y-axis, and/or z-axis. In the present context, the z-axis is taken to be the optical axis or path (vertical from the perspective of FIG. 1), and the x-axis and y-axis are taken to lie in the transverse plane orthogonal to the optical axis or path (i.e., the plane in which the sample stage 112 lies). The sample may generally be any object for which imaging is desired and which is mountable to the sample stage 112. The sample may be biological (e.g., spores, fungi, molds, bacteria, viruses, biological cells or intracellular components, biologically derived particles such as skin cells, detritus, etc.) or non-biological.

The light source 104 may be any light source suitable for optical microscopy, particularly bright field microscopy, and thus may for example be a broadband light source such as a halogen lamp, an incandescent lamp, or other type of lamp. In other embodiments, the light source 104 may be a laser, a laser diode (LD), or a light emitting diode (LED).

The condenser 108 may be any lens or system of lenses configured for concentrating the light from the light source 104 to enhance illumination of the sample. The objective 116 may be any lens or system of lenses configured for collecting the detection light emitted from the sample and focusing the detection light onto the light detector 120.

The light detector 120 may be any imaging device suitable for microscopy such as, for example, the type of imaging device that forms the basis of cameras. In typical embodiments, the light detector 120 is a multi-pixel (or pixelated) imaging device such as, for example, a charge-coupled device (CCD) or an active-pixel sensor (APS) based on complementary metal-oxide-semiconductor (CMOS) technology. In some embodiments, the microscope 100 may include an eyepiece (not separately shown) to enable the user to view the sample, in which case appropriate optical components (e.g., beam splitter) are provided to split the detection light path so that the detection light is directed to both the light detector and the eyepiece. Thus, the light detector 120 in FIG. 1 (and FIG. 2) may be considered as schematically representing an imaging device, or both an imaging device and an eyepiece.

As appreciated by persons skilled in the art, the microscope 100 may further include one or more other types of optical components in the illumination light path and/or the detection light path as desired for a particular application. For example, a relay lens system (i.e., one or more field lenses or relay lenses) may be provided between a spatial light modulator 130 (described below) and the condenser 108, and/or between the objective 116 and the spatial light modulator 130. In some embodiments, the microscope 100 may include infinity corrected optics such as a tube lens 122 positioned between the objective 116 and the light detector 120.

The microscope 100 may also include a computing device 124 communicating with the light detector 120. The computing device 124 may receive images captured by the light detector 120, and digitize and record the images. The computing device 124 may also process captured images as needed for displaying the images on a display device such as a computer screen. The computing device 124 may also be configured for generating one or more three-dimensional (3D) images of the sample from a plurality of perspective images acquired by the light detector 120 as described below. Generally for these purposes, the computing device 124 may include hardware (microprocessor, memory, etc.) and software components as appreciated by persons skilled in the art. In FIG. 1 the computing device 124 may also schematically represent input and output devices that provide a user interface, such as a joystick or mouse controller for user input, a display device for presenting images of the sample, etc.

In the present embodiment, the microscope 100 further includes a spatial light modulator 130 configured for modulating the illumination light or the detection light so as to enable perspective views of the sample to be captured by the light detector 120. The spatial light modulator 130 may enable adjusting the perspective angle of the view imaged at the light detector 120 over a wide range of perspective angles. The microscope 100 may provide user-operated input devices such as, for example, a joystick, mouse controller, controls on a control console, etc., to change the light transmission through the spatial light modulator 130 and thereby enable the user to generate different perspective images at different, selected perspective angles. These images may be viewed in real time through the eyepiece or on a display device to create a sense of a 3D view of the sample. The microscope 100 may be capable of scanning the sample through a range of perspective views, each of which may be captured by the light detector 120 for further processing by the computing device 124. The scanning may be implemented according to a pre-programmed or automated sequence controlled by the computing device 124. Thus adjustments made by the spatial light modulator 130, and consequently perspective views acquired by the light detector 120, may be done in an automated manner under the control of the computing device 124. Alternatively or additionally, a user may operate an input device to control adjustments made by the spatial light modulator 130 and thus select different perspective views to be acquired. The scanning may be done on a sequential basis in which the user can see different perspective views (using an eyepiece as noted above) of the sample in real time as the spatial light modulator 130 is being scanned. In some embodiments, multiple perspective views of the sample captured at different perspective angles may be processed by the computing device 124 as needed to render one or more 3D images, for example through execution of an appropriate data processing algorithm. After acquiring a plurality of perspective images of the sample, the user may operate an input device to display the perspective images in series to create a sense of a 3D view of the sample.

The spatial light modulator 130 may be positioned at a pupil plane in the illumination light path or at a pupil plane in the detection light path. In the embodiment illustrated in FIG. 1, the spatial light modulator 130 is positioned at the pupil plane of the objective 116. Alternatively, the spatial light modulator 130 may be positioned at an equivalent conjugate plane of the pupil plane of the objective 116, such as may be created for example by a relay lens (not shown) as appreciated by persons skilled in the art.

The spatial light modulator 130 may be any device configured for spatially modulating the detection light in a manner that results in the scanning (or adjustment) of the perspective angle (relative to the sample) of the detection light collected by the light detector 120. In some embodiments, the spatial light modulator 130 is or includes an "apertured" plate, i.e., a plate having an aperture through which the detection light passes. The plate may be mounted to a motorized stage to enable the plate to be moved (translated) along at least one axis in the transverse plane (x-axis or y-axis), as indicated by an arrow in FIG. 1. Movement along the axis adjusts the perspective angle. Thus by scanning the aperture, different light collection angles may be selectively imaged onto the light detector 120. In some embodiments, the plate may be configured similar to an adjustable iris such that the size and shape of the aperture are adjustable. The size of the aperture determines the angular resolution, the spatial (lateral) resolution, and depth of focus through the sample. Stopping down (reducing the size of) the aperture provides more angular information and enhanced depth of focus, but results in degraded spatial resolution. However, the microscope 100 may be configured to implement known super-resolution techniques to improve spatial resolution or compensate for lost spatial resolution.

Figure 2:
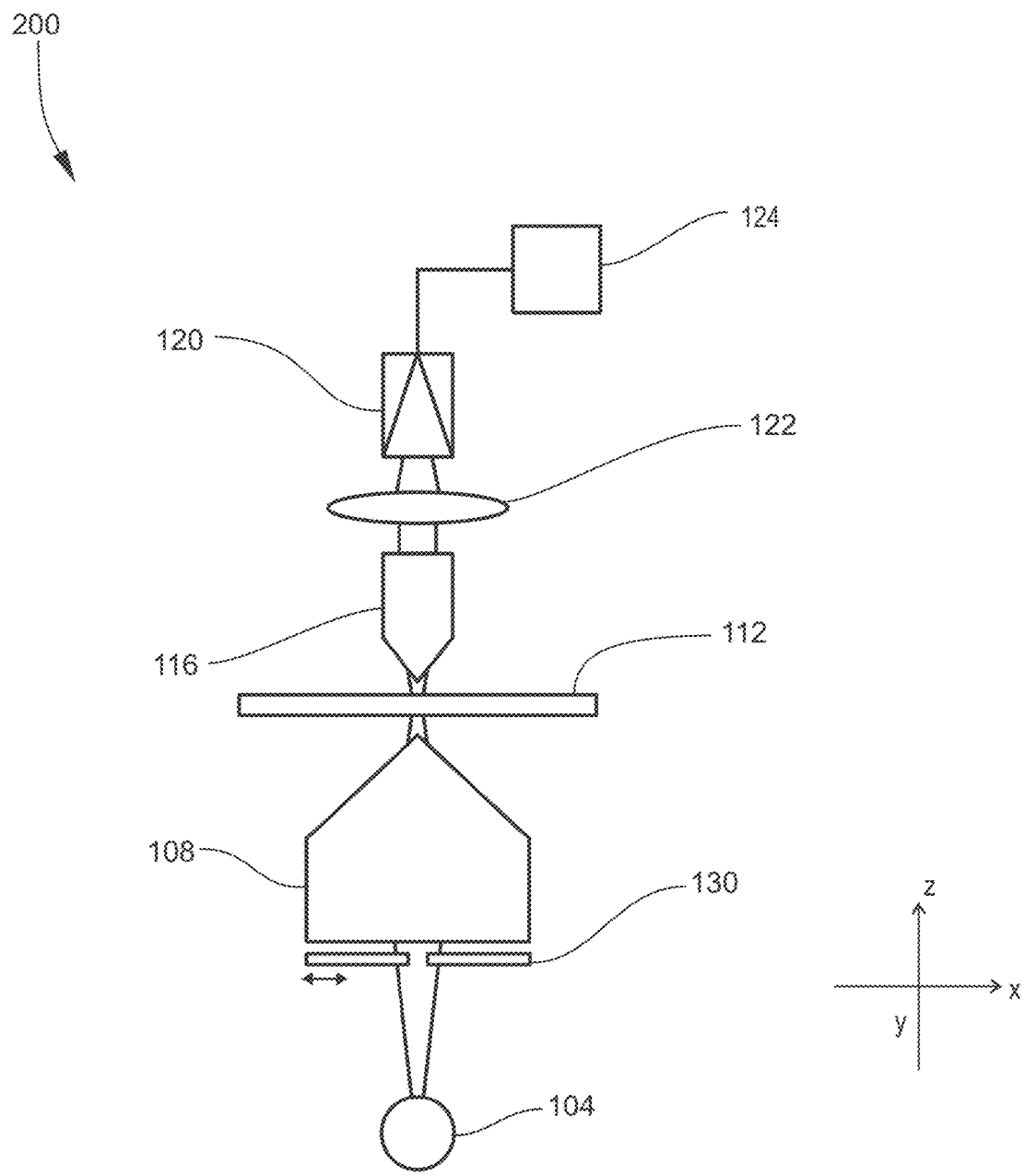
FIG. 2 is a schematic view of another example of a microscope according to some embodiments.

FIG. 2 is a schematic view of an example of a microscope 200 according to some embodiments. Generally, the microscope 200 may be similar to the microscope 100 in FIG. 1. However, in the microscope 200 illustrated in FIG. 2, the spatial light modulator 130 is positioned at the pupil plane of the condenser 108. Alternatively, the spatial light modulator 130 may be positioned at an equivalent conjugate plane of the pupil plane of the condenser 108, such as may be created for example by a relay lens (not shown) as appreciated by persons skilled in the art. The spatial light modulator 130 may be any device configured for spatially modulating the illumination light such that different directions of illumination may be selected on the sample plane. By scanning the spatial light modulator 130, different illumination angles and hence different perspective views of the sample may be obtained. In some embodiments, the spatial light modulator 130 is or includes an "apertured" plate movable along at least one axis as described above. The size of the aperture determines the angular resolution of the illumination. For weakly scattering samples (e.g., biological cells, tissue sections, etc.), the light going through the sample experiences weak scattering and preserves the illumination angles. Thus upon scanning the aperture, different illumination angles and hence different perspective views of the sample may be obtained. As described above, the size of the aperture may be adjustable.

In some embodiments the microscope 100 or 200 may include spatial light modulators 130 positioned both at the pupil plane of the objective 116 (or equivalent conjugate plane thereof) and at the pupil plane of the condenser 108 (or equivalent conjugate plane thereof). Depending on the application (e.g., the type of sample being investigated and/or other factors), one or the other spatial light modulator 130 may be selected for active scanning operation. Generally, each configuration may be considered as having advantages and disadvantages for a given application. In the case of the spatial light modulator 130 being positioned at the pupil plane of the objective 116 or equivalent conjugate plane thereof (FIG. 1), spatial resolution may be degraded as noted above. However, this configuration is not limited to weakly scattering samples, as the detection is done at the collection end. On the other hand, in the case of the spatial light modulator 130 being positioned at the pupil plane of the condenser 108 or equivalent conjugate plane thereof (FIG. 2), there is no trade-off with spatial modulation as the collection aperture is not altered. Additionally, this configuration works well for weakly scattering samples. However, the aperture of the condenser 108 determines the coherence quality of the illumination, and as the aperture is stopped down ringing artifacts may be observed in the image due to interference effects.

In other embodiments, the spatial light modulator 130 may be or include a digital micromirror device (DMD). As appreciated by persons skilled in the art, a DMD may include an array of micromirrors tiltable between an ON position and an OFF position. In the ON position, a selected micromirror reflects light in a direction that forms a part of the detection light path (e.g., toward the light detector 120) or illumination light path (e.g., toward the sample). In the OFF position, the selected micromirror reflects light in a direction toward a light trap (beam dump) such that the light reflected from that particular micromirror does not form a part of the detection light path or illumination light path. The micromirrors of the array are individually controllable (e.g., by the computing device 124), such as by having individually addressable voltage states. In this embodiment, the perspective angle of the view imaged at the light detector 120 is determined by which micromirror (or group of micromirrors) are in the ON position while the other micromirrors are in the OFF position. Adjustment or scanning of the perspective angle is accomplished by switching micromirrors of the array between ON and OFF positions in an appropriate sequence. It will be understood that depending on the design and space-occupying requirements of the microscope 100 or 200, the provision of a DMD may also entail the addition of one or more other mirrors and/or beam splitters in the optical path.

In other embodiments, the spatial light modulator 130 may be or include a liquid crystal on silicon (LCOS) device or an electrostatic microshutter device. As appreciated by persons skilled in the art, an LCOS device may include an array of cells (pixels) individually controllable to either transmit light (ON state) or block light (OFF state). Similarly, an electrostatic microshutter device may include an array of microshutters individually controllable to either transmit light (ON state) or block light (OFF state).

Figure 3:
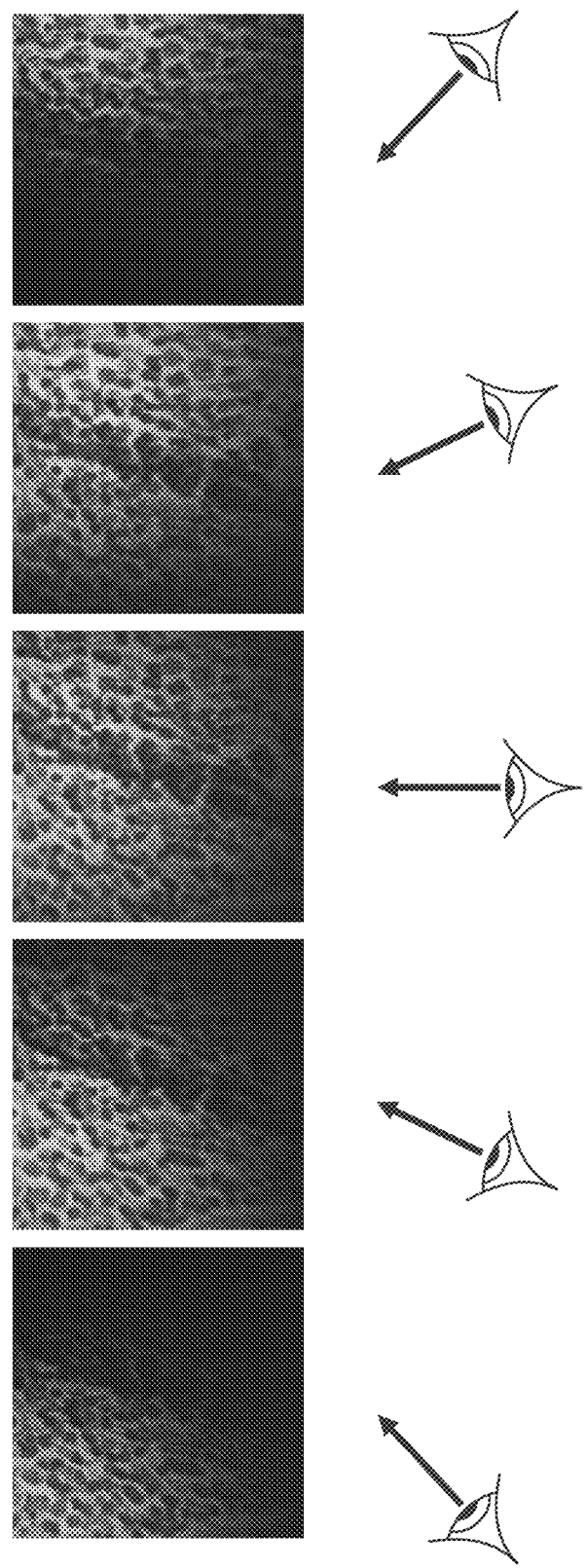
FIG. 3 is a set of images of a sample captured at five different perspective angles, utilizing a microscope configured as illustrated in FIG. 1.
Figure 4:
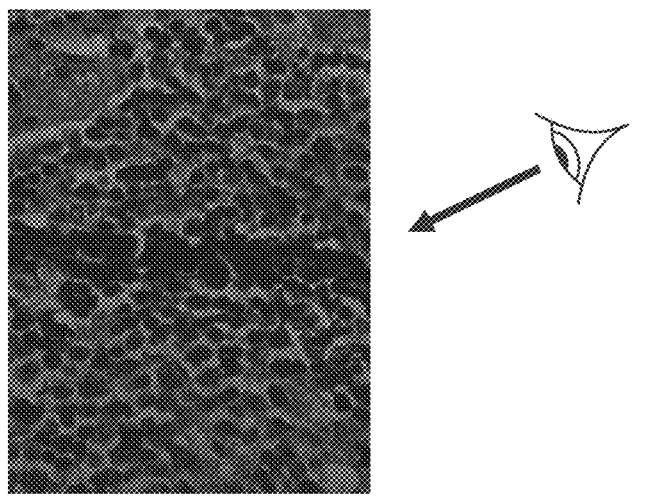
FIG. 4 is a set of images of the sample captured at three different perspective angles, utilizing a microscope configured as illustrated in FIG. 2.
Figure 4:
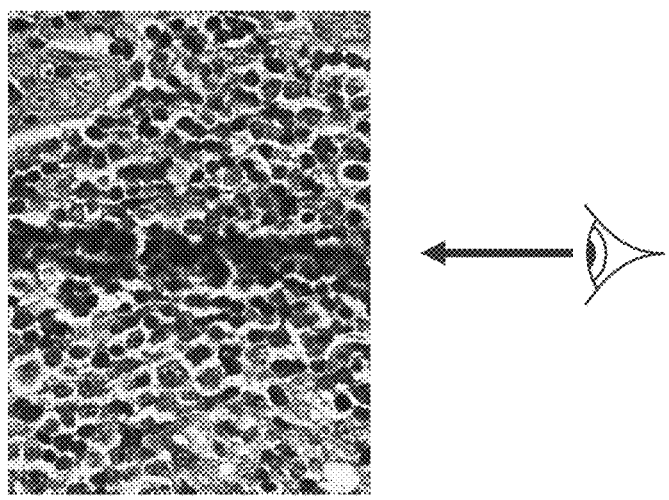
Figure 4:
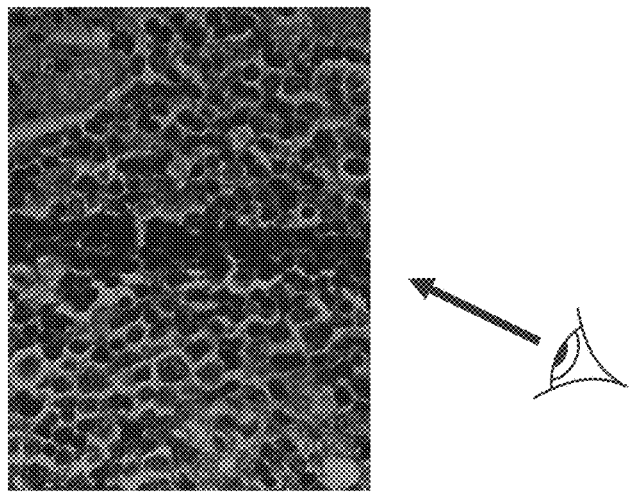

FIGS. 3 and 4 provide examples of different perspective views acquired from a stained tissue sample. Specifically, FIG. 3 is a set of images of the sample captured at five different perspective angles, utilizing a microscope configured as described above in conjunction with FIG. 1. The relative orientations of the perspective angles utilized are schematically indicated by arrows extending from the eye symbols. The scanning direction of the spatial light modulator 130 is indicated by the horizontal, double-headed arrow. FIG. 4 is a set of images of the sample captured at three different perspective angles, utilizing a microscope configured as described above in conjunction with FIG. 2. In both cases, an adjustable aperture was utilized as the spatial light modulator 130 as described above.

Figure 5:
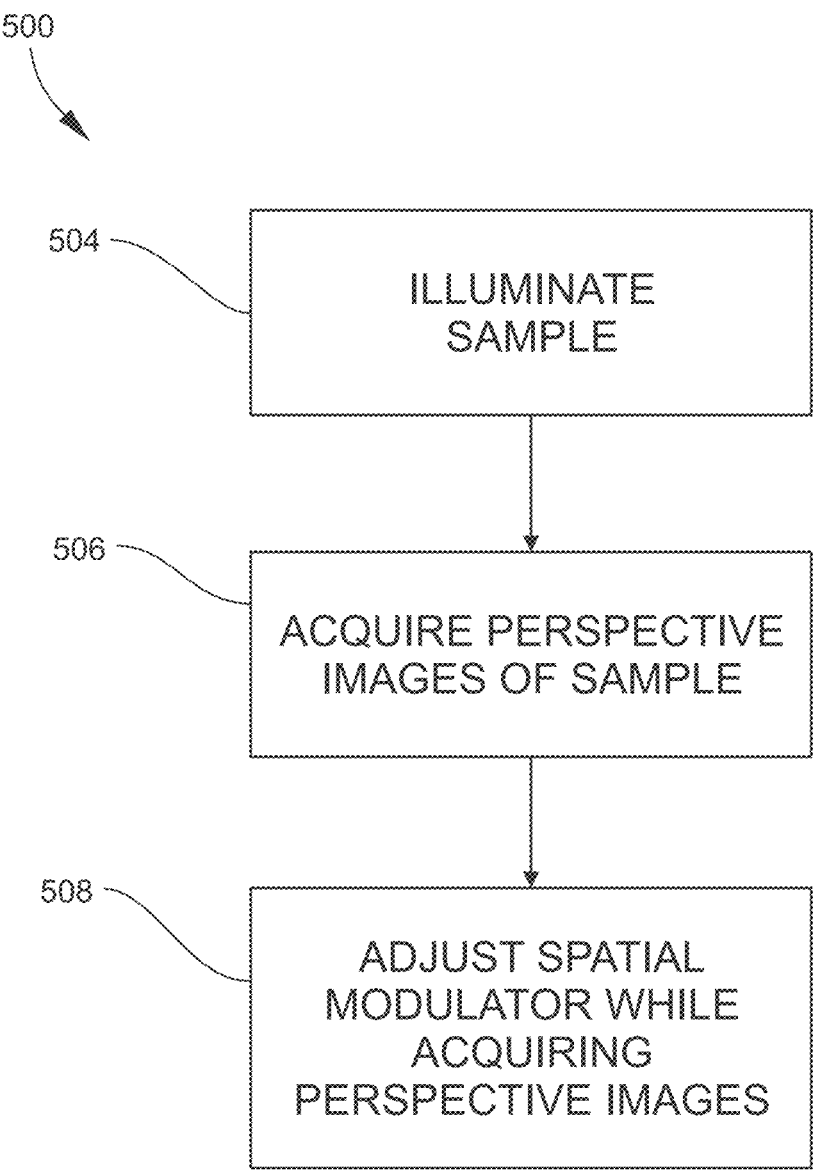
FIG. 5 is a flow diagram of an example of a method for acquiring perspective images of a sample according to some embodiments.

FIG. 5 is a flow diagram 500 of an example of a method for acquiring perspective images of a sample according to some embodiments. In the method, the sample may be illuminated (step 504) by directing illumination light along an illumination light path from a light source, through a condenser, and to the sample. A plurality of perspective images of the sample may be acquired (step 506) by directing detection light along a detection light path from the sample, through an objective, and to a light detector. While acquiring the perspective images, a spatial light modulator may be adjusted (step 508) such that the plurality of perspective images acquired comprises different perspective images acquired at different perspective angles of view of the sample. The spatial light modulator may be positioned at a pupil plane or an equivalent conjugate plane thereof in the illumination light path or in the detection light path. In some embodiments, the method may be implemented utilizing the microscope 100 or 200 described above and illustrated in FIG. 1 or FIG. 2. In some embodiments, the flow diagram of FIG. 5 may be representative of any microscope configured to implement steps 503 to 508 just described.

Figure 6:
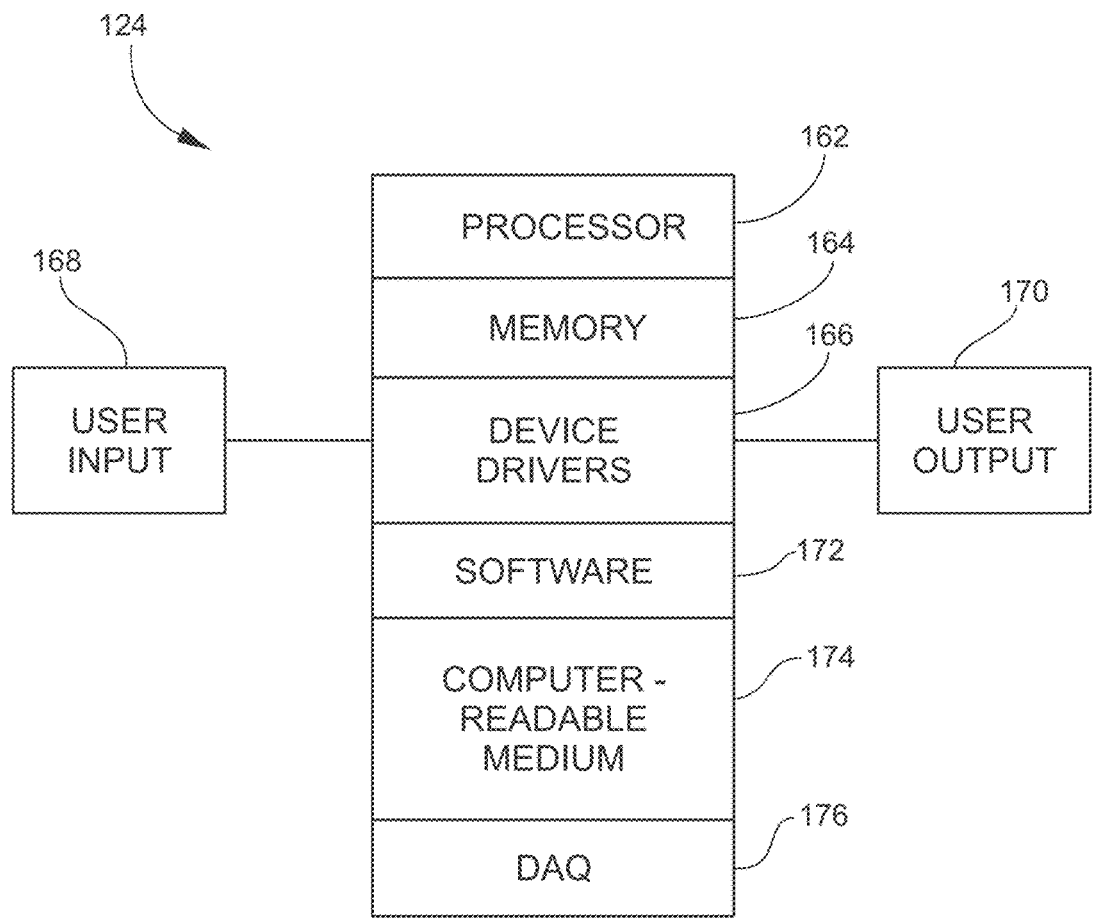
FIG. 6 is a schematic view of an example of a computing device that may be included as part of or in communication with a microscope according to some embodiments.

FIG. 6 is a schematic view of a non-limiting example of the computing device 124 according to some embodiments. In the illustrated embodiment the computing device 124 includes a processor 162 (typically electronics-based), which may be representative of a main electronic processor providing overall control, and one or more electronic processors configured for dedicated control operations or specific signal processing tasks (e.g., a graphics processing unit, or GPU). The computing device 124 also includes one or more memories 164 (volatile and/or non-volatile) for storing data and/or software. The computing device 124 may also include one or more device drivers 166 for controlling one or more types of user interface devices and providing an interface between the user interface devices and components of the computing device 124 communicating with the user interface devices. Such user interface devices may include user input devices 168 (e.g., keyboard, keypad, touch screen, mouse, joystick, trackball, and the like) and user output devices 170 (e.g., display screen, printer, visual indicators or alerts, audible indicators or alerts, and the like). In various embodiments, the computing device 124 may be considered as including one or more user input devices 168 and/or user output devices 170, or at least as communicating with them. The computing device 124 may also include one or more types of computer programs or software 172 contained in memory and/or on one or more types of computer-readable media 174. Computer programs or software may contain instructions (e.g., logic instructions) for performing all or part of any of the methods disclosed herein. Computer programs or software may include application software and system software. System software may include an operating system (e.g., a Microsoft Windows® operating system) for controlling and managing various functions of the computing device 124, including interaction between hardware and application software. In particular, the operating system may provide a graphical user interface (GUI) displayable via a user output device 170 such as a display screen, and with which a user may interact with the use of a user input device 168 such as a keyboard or a pointing device (e.g., mouse). The computing device 124 may also include one or more data acquisition/signal conditioning components 176 (as may be embodied in hardware, firmware and/or software) for receiving and processing the imaging data captured by the light detector 120 (FIGS. 1 and 2), including formatting data for presentation in graphical form by the GUI, generating 3D images, etc.

It will be understood that FIGS. 1, 2 and 6 are high-level schematic depictions of an example of a microscope 100 or 200 and associated computing device 124 consistent with the present disclosure. Other components, such as additional structures, optics components, electronics, and computer- or electronic processor-related components may be included as needed for practical implementations. It will also be understood that the computing device 124 is schematically represented in FIG. 6 as functional blocks intended to represent structures (e.g., circuitries, mechanisms, hardware, firmware, software, etc.) that may be provided. The various functional blocks and signal links have been arbitrarily located for purposes of illustration only and are not limiting in any manner. Persons skilled in the art will appreciate that, in practice, the functions of the computing device 124 may be implemented in a variety of ways and not necessarily in the exact manner illustrated in FIGS. 1, 2 and 6 and described herein.

Exemplary Embodiments

Exemplary embodiments provided in accordance with the presently disclosed subject matter include, but are not limited to, the following:

1. A microscope, comprising: a light source; a condenser; a sample stage; an objective; a light detector configured for acquiring a plurality of perspective images at a plurality of different perspective angles, wherein the microscope defines an illumination light path from the light source, through the condenser and to the sample stage, and a detection light path from the sample stage, through the objective and to the light detector; and a spatial light modulator configured for adjusting the perspective angle of a view imaged at the light detector, wherein the spatial light modulator is positioned at a pupil plane or an equivalent conjugate plane thereof in the illumination light path or in the detection light path.

2. The microscope of embodiment 1, wherein the spatial light modulator is positioned at a pupil plane of the condenser or an equivalent conjugate plane thereof, or at a pupil plane of the objective or an equivalent conjugate plane thereof.

3. The microscope of embodiment 1 or 2, wherein the spatial light modulator comprises a plate having an adjustable aperture and movable along an axis, a digital micromirror device, a liquid crystal on silicon device, or an electrostatic microshutter device.

4. The microscope of embodiment 1 or 2, wherein the spatial light modulator comprises a plate having an aperture and movable along an axis, and wherein the shape and size of the aperture are adjustable.

5. The microscope of any of the preceding embodiments, comprising a computing device configured for generating a three-dimensional image from the plurality of perspective images acquired by the light detector.

6. The microscope of any of the preceding embodiments, wherein the light source is a lamp, a laser, a laser diode, or a light emitting diode.

7. The microscope of any of the preceding embodiments, wherein the light detector is a charge-coupled device or an active-pixel sensor.

8. The microscope of any of the preceding embodiments, comprising a relay lens system between the spatial light modulator and the condenser.

9. The microscope of any of the preceding embodiments, comprising a relay lens system between the objective and the spatial light modulator.

10. The microscope of any of the preceding embodiments, comprising a user-operated input device configured for controlling adjustments made by the spatial light modulator.

11. A method for acquiring perspective images of a sample, the method comprising: illuminating the sample by directing illumination light along an illumination light path from a light source, through a condenser, and to the sample; acquiring a plurality of perspective images of the sample by directing detection light along a detection light path from the sample, through an objective, and to a light detector; and while acquiring, adjusting a spatial light modulator such that the plurality of perspective images acquired comprises different perspective images acquired at different perspective angles of view of the sample, wherein the spatial light modulator is positioned at a pupil plane or an equivalent conjugate plane thereof in the illumination light path or in the detection light path.

12. The method of embodiment 11, wherein the spatial light modulator is positioned at a pupil plane of the condenser or an equivalent conjugate plane thereof, such that adjusting the spatial light modulator adjusts an angle at which light is directed to the sample.

13. The method of embodiment 11, wherein the spatial light modulator is positioned at a pupil plane of the objective or an equivalent conjugate plane thereof, such that adjusting the spatial light modulator adjusts an angle at which light is directed to the light detector.

14. The method of any of embodiments 11 to 13, wherein adjusting the spatial light modulator is selected from the group consisting of: moving a plate having an aperture along an axis; moving one or more micromirrors of a digital micromirror device; activating one or more pixels of a liquid crystal on silicon device; and opening one or more microshutters of an electrostatic microshutter device.

15. The method of any of embodiments 11 to 13, wherein the spatial light modulator comprises a plate having an aperture, and further comprising adjusting a shape and a size of the aperture.

16. The method of any of embodiments 11 to 15, comprising generating three-dimensional images of the sample, depth maps of the sample, or both of the foregoing, from the plurality of perspective images acquired.

17. The method of any of embodiments 11 to 16, wherein adjusting the spatial light modulator comprises operating an input device to select different perspective images of the sample.

18. The method of any of embodiments 11 to 17, comprising displaying the different perspective images acquired on a display device.

19. The method of embodiment 18, comprising operating an input device to select different perspective images for display on the display device.

20. A microscope configured for performing all or part of the method of any of the preceding embodiments.

21. A system for acquiring perspective images of a sample, the system comprising: a processor and a memory configured for performing all or part of the method of any of the preceding embodiments.

22. A computer-readable storage medium comprising instructions for performing all or part of the method of any of the preceding embodiments.

23. A system comprising the computer-readable storage medium of embodiment 22.

Methods for acquiring perspective images of a sample such as described above and illustrated in the Figures may be performed (carried out), for example, in a system that includes a processor and a memory as may be embodied in, for example, a computing device which may communicate with a user input device and/or a user output device. In some embodiments, the system for acquiring perspective images of a sample (or an associated computing device) may be considered as including the user input device and/or the user output device. As used herein, the term "perform" or "carry out" may encompass actions such as controlling and/or signal or data transmission. For example, a computing device such as illustrated in FIGS. 1, 2 and 6, or a processor thereof, may perform a method step by controlling another component involved in performing the method step. Performing or controlling may involve making calculations, or sending and/or receiving signals (e.g., control signals, instructions, measurement signals, parameter values, data, etc.).

As used herein, an "interface" or "user interface" is generally a system by which users interact with a computing device. An interface may include an input (e.g., a user input device) for allowing users to manipulate a computing device, and may include an output (e.g., a user output device) for allowing the system to present information and/or data, indicate the effects of the user's manipulation, etc. An example of an interface on a computing device includes a graphical user interface (GUI) that allows users to interact with programs in more ways than typing. A GUI typically may offer display objects, and visual indicators, as opposed to (or in addition to) text-based interfaces, typed command labels or text navigation to represent information and actions available to a user. For example, an interface may be a display window or display object, which is selectable by a user of a computing device for interaction. The display object may be displayed on a display screen of a computing device and may be selected by and interacted with by a user using the interface. In one non-limiting example, the display of the computing device may be a touch screen, which may display the display icon. The user may depress the area of the touch screen at which the display icon is displayed for selecting the display icon. In another example, the user may use any other suitable interface of a computing device, such as a keypad, to select the display icon or display object. For example, the user may use a track ball or arrow keys for moving a cursor to highlight and select the display object.

It will be understood that one or more of the processes, sub-processes, and process steps described herein may be performed by hardware, firmware, software, or a combination of two or more of the foregoing, on one or more electronic or digitally-controlled devices. The software may reside in a software memory (not shown) in a suitable electronic processing component or system such as, for example, the computing device 124 schematically depicted in FIGS. 1, 2 and 6. The software memory may include an ordered listing of executable instructions for implementing logical functions (that is, "logic" that may be implemented in digital form such as digital circuitry or source code, or in analog form such as an analog source such as an analog electrical, sound, or video signal). The instructions may be executed within a processing module, which includes, for example, one or more microprocessors, general purpose processors, combinations of processors, digital signal processors (DSPs), or application specific integrated circuits (ASICs). Further, the schematic diagrams describe a logical division of functions having physical (hardware and/or software) implementations that are not limited by architecture or the physical layout of the functions. The examples of systems described herein may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., the computing device 124 in FIGS. 1, 2 and 6), direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this disclosure, a computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program may be electronically captured via, for instance, optical scanning of the paper or other medium, then compiled, interpreted, or otherwise processed in a suitable manner if necessary, and then stored in a computer memory or machine memory.

It will also be understood that the term "in signal communication" as used herein means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

More generally, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A microscope, comprising:
    a light source;
    a condenser;
    a sample stage;
    an objective;
    a light detector configured for acquiring a plurality of perspective images at a plurality of different perspective angles, wherein the microscope defines an illumination light path from the light source, through the condenser and to the sample stage, and a detection light path from the sample stage, through the objective and to the light detector; and
    a spatial light modulator configured for adjusting the perspective angle of a view imaged at the light detector, wherein the spatial light modulator is positioned at a pupil plane or an equivalent conjugate plane thereof in the illumination light path or in the detection light path.

2. The microscope of claim 1, wherein the spatial light modulator is positioned at a pupil plane of the condenser or an equivalent conjugate plane thereof, or at a pupil plane of the objective or an equivalent conjugate plane thereof.

3. The microscope of claim 1, wherein the spatial light modulator comprises a plate having an adjustable aperture and movable along an axis, a digital micromirror device, a liquid crystal on silicon device, or an electrostatic microshutter device.

4. The microscope of claim 1, wherein the spatial light modulator comprises a plate having an aperture and movable along an axis, and wherein a shape, a size, or both the shape and the size of the aperture are adjustable.

5. The microscope of claim 1, comprising a computing device comprising a configuration selected from the group consisting of:
    a configuration for displaying a selected one or more of the acquired perspective images on a display device;
    a configuration for controlling adjustments made by the spatial light modulator according to an automated sequence, wherein the plurality of perspective images are acquired according to the automated sequence;
    a configuration for generating a three-dimensional image from the plurality of perspective images acquired by the light detector; and
    a combination of two or more of the foregoing.

6. The microscope of claim 1, wherein the light source is a lamp, a laser, a laser diode, or a light emitting diode.

7. The microscope of claim 1, wherein the light detector is a charge-coupled device or an active-pixel sensor.

8. The microscope of claim 1, comprising a relay lens system between the spatial light modulator and the condenser.

9. The microscope of claim 1, comprising a relay lens system between the objective and the spatial light modulator.

10. The microscope of claim 1, comprising a user-operated input device comprising a configuration selected from the group consisting of:
    a configuration for controlling adjustments made by the spatial light modulator;
    a configuration for selecting one or more of the acquired perspective images for display on a display device; and
    both of the foregoing.

11. A method for acquiring perspective images of a sample, the method comprising:
    illuminating the sample by directing illumination light along an illumination light path from a light source, through a condenser, and to the sample;
    acquiring a plurality of perspective images of the sample by directing detection light along a detection light path from the sample, through an objective, and to a light detector; and while acquiring, adjusting a spatial light modulator such that the plurality of perspective images acquired comprises different perspective images acquired at different perspective angles of view of the sample, wherein the spatial light modulator is positioned at a pupil plane or an equivalent conjugate plane thereof in the illumination light path or in the detection light path.

12. The method of claim 11, wherein the spatial light modulator is positioned at a pupil plane of the condenser or an equivalent conjugate plane thereof, such that adjusting the spatial light modulator adjusts an angle at which light is directed to the sample.

13. The method of claim 11, wherein the spatial light modulator is positioned at a pupil plane of the objective or an equivalent conjugate plane thereof, such that adjusting the spatial light modulator adjusts an angle at which light is directed to the light detector.

14. The method of claim 11, wherein adjusting the spatial light modulator is selected from the group consisting of: moving a plate having an aperture along an axis; moving one or more micromirrors of a digital micromirror device; activating one or more pixels of a liquid crystal on silicon device; and opening one or more microshutters of an electrostatic microshutter device.

15. The method of claim 11, wherein the spatial light modulator comprises a plate having an aperture, and further comprising adjusting a shape and a size of the aperture.

16. The method of claim 11, comprising generating three-dimensional images of the sample, depth maps of the sample, or both of the foregoing, from the plurality of perspective images acquired.

17. The method of claim 11, wherein adjusting the spatial light modulator comprises a step selected from the group consisting of:
   operating an input device to select different perspective images of the sample;
   controlling adjustments made by the spatial light modulator according to an automated sequence, wherein the plurality of perspective images are acquired according to the automated sequence; and
   both of the foregoing.

18. The method of claim 11, comprising displaying the different perspective images acquired on a display device.

19. The method of claim 18, comprising operating an input device to select different perspective images for display on the display device.

20. A microscope configured for performing the method of claim 11.

* * * * *